Oct. 6, 1953

C. L. HALL 2,654,125

METHOD OF FLAKING WAX

Original Filed Sept. 7, 1950

INVENTOR.
CHESTER L. HALL
BY
Busser, Smith and Harding
ATTORNEYS

Oct. 6, 1953 C. L. HALL 2,654,125
METHOD OF FLAKING WAX
Original Filed Sept. 7, 1950 2 Sheets-Sheet 2
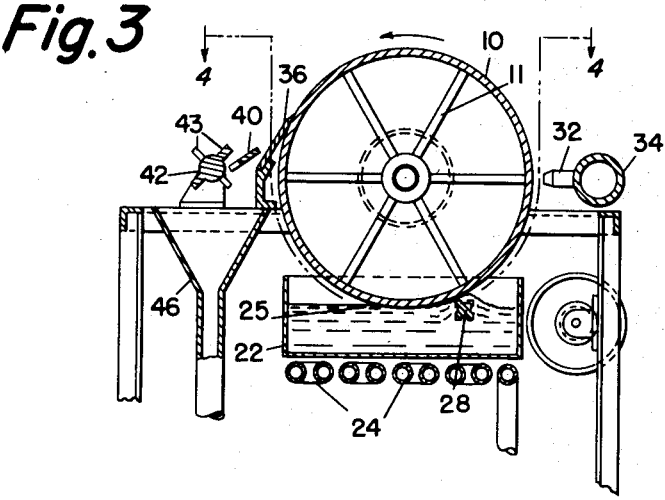
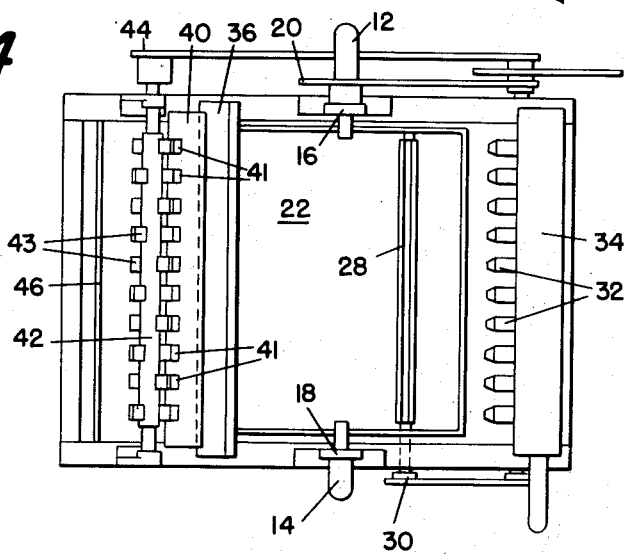
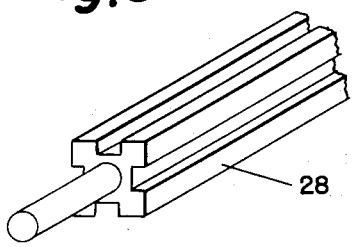
INVENTOR.
CHESTER L. HALL
BY
ATTORNEYS Patented Oct. 6, 1953

2,654,125

UNITED STATES PATENT OFFICE 2,654,125

METHOD OF FLAKING WAX

Chester L. Hall, Chester, Pa., assignor to Sun Oil Company, Philadelphia, Pa., a corporation of New Jersey Original application September 7, 1950, Serial No. 183,574. Divided and this application March 5, 1952, Serial No. 274,877

5 Claims. (Cl. 18—47.5)

This invention relates in general to forming wax cakes and more particularly to a method for preparing molten wax for extrusion.

The preparation of wax for use by consumers requires shaping it into rectangular cakes which are dimensioned to meet the demand. In the past, molten wax was poured into chilled molds and permitted to stand until solidified. Due to the nature of wax, the exterior rapidly became solid thereby insulating the soft and often liquid wax in the center of the cake and required long periods of time for complete cooling. An advance over the casting method was achieved by the introduction of methods of extruding.

Where the later methods are used, a better product is obtained if the molten wax is pre-chilled before it is introduced to the extruder. This is done, normally, by spreading the wax on a chilled surface from which it is removed and fed to the extruder mechanism. In order to be rapidly pressed into an homogeneous cake of the proper color acceptable to the consumer, the wax entering the extruder should be of substantially uniform size and small enough to be immediately gripped by the extruder screw.

In preparing the wax for extruding, a rotating drum, cooled from within, was used as the chilling surface. This chilled surface was either dipped into a molten mass of wax as it rotated, or was sprayed with molten wax. Where dipping alone was used, the sheet became very heavy and peeled from the drum. The resulting pieces were too chunky to pass through the extruder and required further reduction in size. If a spray alone was applied, the coat was thin and bound tightly to the drum. The use of both a dipping and spraying action gave a layer of wax on the rotating cylinder almost as thick as the dipping procedure alone and as difficult to work.

Where either or both of these methods were used, it was necessary to remove the wax from the rotating surface of the drum as a first step in the extrusion process. It is readily discernable that the large, irregular sheets resulting from the dipping operation when the wax would peel from the drum, required considerable handling before it was of proper size to enter the extruder. In addition, when it adhered so tightly that it could not be removed, as when the spraying method was used, it was necessary to stop the process and laboriously remove the wax from the coated drum. All this was time consuming and greatly retarded the extrusion method. It is, therefore, an object of this invention to provide a method for overcoming these delays in preparing wax for extruding.

In accordance with the present invention, the wax is prepared for the extruder by first improving the method and apparatus for applying the molten wax to the chilled surface of a rotating drum so that it is readily removed, and secondly, by improving the removing device. This application covering the method of preparing wax for extrusion is a division of the original case directed to the apparatus shown, filed September 7, 1950, as application Serial Number 183,574. As the wax sheet is separated from the rotating drum it is mechanically broken into pieces of approximately uniform size which are passed to the extruder in uninterrupted flow. In this way, the objectionable operating features of present devices are overcome and the extrusion of wax cakes is made continuous.

In order that a better understanding of the invention may be had, reference is made to the following detailed description and the accompanying drawings in which:

Figure 3 is a vertical section of Figure 1 taken along line 3—3.

Figure 4 is a horizontal section of Figure 2 taken along line 4—4 of Figure 3.

Figure 5 is a partial perspective view of an element.

The extrusion of wax cakes has been developed to meet greater demands for the product by a continuous process which eliminates the long periods of curing required by older methods. However wax must be prepared before it can be introduced to the extruder if a commercial product is to be obtained. The early flaking devices of either the dipping or spraying types as described, subsequently cleaned with a scraper, did not prepare the wax properly for the extrusion step. To obtain a dense, uniform wax cake of color acceptable to the trade, as well as to make the process continuous, wax flakes of substantially uniform size fed at a constant rate to the extrusion device must be assured.

The size and general uniformity of shape of the wax flakes are important factors and are closely related to the screw-pitch and length of travel required for the extruder. In turn, the preparation of these wax flakes depends upon the type of wax and the ability to free the wax from the surface of the chilling device. It has been discovered that the removability of the wax sheet for flaking is controlled by the way the wax is put on the chilled surface as well as dependent on the mechanically operated removing elements.

According to the present invention the wax of proper thickness is deposited on the rotating chilled surface in a manner to make it easily removed, and is then reduced from the large sheet sections to a uniform flake of size proper for the extruder dimensions. In this way the process is uninterrupted and the product of good commercial quality.

Figure 1:
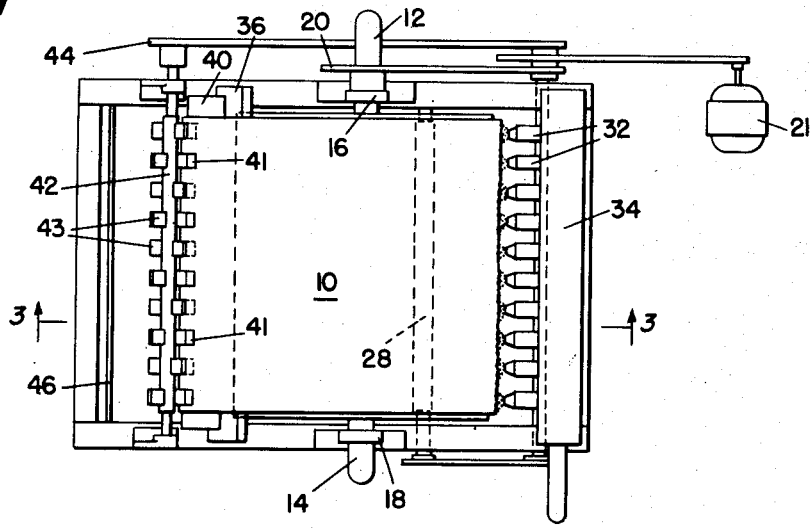
Figure 1 is a plan view of the assembled device.

In the drawings showing one form of device capable of following the disclosed method, where like elements are designated by like numerals, Figure 1 illustrates a plan view of the combination. A cylindrical drum 10, with a cooling liquid inlet 12 and an outlet 14, is rotatably supported by conventional bearings 16 and 18. A driving pulley 20 is shown as one source of power for rotating the chilled drum 10. A conventional electric motor 21 is shown diagrammatically as the source of power.

Figure 2:
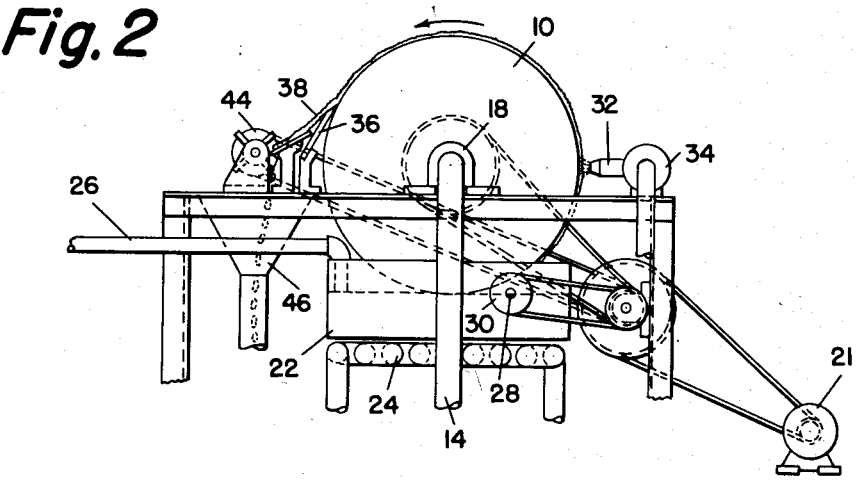
Figure 2 is an end elevation.

Referring to Figure 2, it will be noted that the drum 10 is positioned to dip into a molten wax bath 22 which is heated as by steam coils 24 and supplied by an inlet pipe 26. A beater 28, Figures 3, 4, and 5, illustrated as a milled or fluted rectangular rod, is rotated by pulley 30, beneath the periphery of drum 10 in the wax bath forward (in the direction of rotation) of the center of the drum support. Although the beater placed at the locus of the chilled surface leaving the wax is illustrated as one means for obtaining the initial rough coat of wax, it will be evident that other means such as moving brushes, squeegees, air blasts and the like located either above the wax level, or immediately below the wax surface, will suffice. This is clearly shown in the sectional view of Figure 3. The rotation of the chilled drum 10 is shown here to be counterclockwise which raises the initially dipped surface from the area of the agitated wax 25 surrounding the beater 28.

The surface of the drum 10 as coated in the agitated wax bath is then revolved to the spray area of the pressure nozzles 32 which are connected to a manifold 34 for spraying molten wax under an even and equally distributed pressure. As the drum 10 continues to rotate, the dipped and sprayed coats of wax are solidified and cover the drum as a sheet. The scraper 36 is adjusted as shown and curls the wax cake away from the drum as shown at 38. In passing downward over the scraper 36, or doctor as it is termed in the art, the wax sheet slides over the breaker bar 40 and is engaged by the shredder 42.

The wax sheet extending over the breaker bar 40, toothed on its lower edge as at 41, is broken into pieces of wax uniform in size and shape by the lugs 43 on the shredder 42. The lugs 43 are shown as set in pairs, each pair at right angles to the adjoining pairs of lugs. By means of a pulley 44, the shredder bar 42 and its attached lugs 43 are rotated to engage the wax sheet as it passes over the doctor bar 36 and breaker bar 40 and then forces the flakes of wax downwardly through the spaces between the teeth 41 in the breaker bar 40. The wax flakes are then dropped into the hopper 46 and transferred through a collector to the extruder, not shown.

The sectional views of the apparatus in Figures 3 and 4 are shown to give a complete understanding of the device and show the relative positions of the operating elements. The sectional view of the drum 10 in Figure 3 is shown with the necessary bracing 11 which, it is understood, may be arranged to support the chilled surface as desired. The relative location of the beater 28 and the nozzle bank 32 may be brought closer together or separated farther apart in order to adjust the wax coatings and the degree of solidity of the first coat prior to spraying the second coat. As has already been indicated, the beater 28 is positioned to agitate the molten wax surface in the direction of the emerging drum areas. It will be evident that the quantity of wax forced from the nozzles and the rapidity of rotation of the chilled drum will regulate the thickness of the sprayed wax coat. Also the scraper or doctor 36 may be adjusted in sliding engagement with the breaker bar to be raised or lowered on the drum 10 or to change the engaging angle with the chilled surface.

In operation, the chilled surface of the drum 10 dips into the molten wax 25 as it is presented by the bath 22, the depth of the wax being regulated by the flow of the wax through the inlet 26. An initial rough and irregular coating of wax is picked up on the emerging chilled surface of the drum by the agitation of the wax surface by the beater 28 or similar means at the locus of the wax surface. The roughening means is adjusted relative to the molten wax to ripple the surface of the wax bath against the drum surface as it lifts from the molten wax. The initial wax coating is, therefore, streaked and spotted due to the aeration and splashing of the wax as the chilled surface moves away from wax contact. The spray nozzles 32 then deposit an even spray of wax of determined thickness over the length of the chilled surface covering the irregular rough coat and the exposed surface fully. These two coats adhere together but do not destroy the rough and irregular initial coat. The aerated, rough undercoat of wax between the smoothly applied spray coat and the chilled surface of the drum breaks the adhesion of the wax coats which would be present if a simple dipping bath or spray nozzles were used separately or together without the roughening means 28.

The two coats of wax now deposited on the chilled surface of the rotating drum 10 are reduced in temperature as the drum rotates toward the scraper 36. As the undercoating of wax is rough and irregular it prevents complete adhesion of the uniformly sprayed coat to the drum surface which characterized the early spray methods. Consequently the wax of proper thickness, ready to be freed from the drum surface, turns up at the scraper edge leaving the drum clean and ready for continued operation. The disengaged sheet of wax then follows the surface of the scraper 36 and comes into contact with the breaker bar 40 and the rotating shredder 42. The spaces between the teeth of the breaker bar 40 allow the rotating lugs 43 on the shredder 42 to pass through, breaking the wax sheet into flakes. The size of the flakes may be increased or decreased by changing the size of the breaker bar teeth spaces and the size of the shredder lugs as well as increasing or decreasing the speed of rotation of the shredder.

From the above description, it is apparent that a method is provided which preliminarily conditions wax for the process of extrusion. It permits the process to operate continuously eliminating the interruptions previously inherent in extruding processes. Furthermore, the flaking of the wax as herein disclosed improves the texture and color of the resulting wax cake to meet the consumer demands.

It is further apparent from the above description that a method is provided which will permit many variations and substitutions yet remain within the spirit of the invention. Apparatus to produce the rough and finished wax coats on the chilled collecting surface are readily substituted, as indicated, for the devices described in the disclosed embodiment. Substitutes are readily discernible, also, for the remaining elements by those versed in the art. It is obvious that the construction and arrangement of the parts, in general, may be varied in many ways without departing from the scope of the appended claims.

I claim:

1. A method of preparing wax for use in an extruding process comprising the steps of depositing a preliminary irregular coating of molten wax on a chilled surface by agitating the wax during deposition, adding a smooth even wax coat over the irregular coating on the chilled surface, and removing the wax coating thus formed as a sheet.

2. A method of preparing wax for use in an extruding process comprising the steps of depositing an initial coating of wax on a chilled surface from a mass of molten wax, agitating said coating while solidifying to form a rough coating on said chilled surface, spraying a thin film of liquid wax on said rough coating, solidifying said thin film to form, with said rough coating, a single wax sheet which is readily removable from said chilled surface, and removing the wax sheet from the chilled surface.

3. The process defined in claim 2 further characterized by breaking the wax sheet into flakes of substantially equal size as it is removed from the chilled surface.

4. A method of preparing wax for use in an extruding process for manufacturing homogeneous wax forms comprising the steps of initially depositing a roughened coat of molten wax on a chilled surface by agitating the wax at the locus of contact with said surface, spraying on the roughened coat a thin wax film covering the chilled surface area, and removing the resulting wax sheet from the chilled surface after solidifying.

5. The process defined in claim 4 further characterized by beating the wax sheet into flakes of substantially the same size at the locus of removal from the chilled surface.

CHESTER L. HALL.

References Cited in the file of this patent

UNITED STATES PATENTS

| Number | Name | Date |
| --- | --- | --- |
| 154,034 | Frederici | Aug. 11, 1874 |